United States Patent
Ge et al.

(10) Patent No.: US 11,134,455 B2
(45) Date of Patent: Sep. 28, 2021

(54) SYNCHRONIZATION SIGNAL TRANSMITTING OR RECEIVING METHOD, BASE STATION, AND USER EQUIPMENT

(71) Applicant: HUAWEI TECHNOLOGIES CO., LTD., Guangdong (CN)

(72) Inventors: Shibin Ge, Shanghai (CN); Jin Liu, Shenzhen (CN); Xiaoyan Bi, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/186,780

(22) Filed: Nov. 12, 2018

(65) Prior Publication Data

US 2019/0082405 A1    Mar. 14, 2019

Related U.S. Application Data

(63) Continuation of application No. PCT/CN2017/081650, filed on Apr. 24, 2017.

(30) Foreign Application Priority Data

May 12, 2016  (CN) .......................... 201610321814.4

(51) Int. Cl.
  *H04W 56/00*   (2009.01)
  *H04B 7/06*    (2006.01)
  (Continued)

(52) U.S. Cl.
  CPC ........ *H04W 56/001* (2013.01); *H04B 7/0452* (2013.01); *H04B 7/06* (2013.01);
  (Continued)

(58) Field of Classification Search
  CPC ... H04W 56/001; H04W 16/28; H04W 56/00; H04B 7/0452; H04B 7/06; H04L 27/2605
  See application file for complete search history.

(56) References Cited

U.S. PATENT DOCUMENTS

| | | |
|---|---|---|
| 2014/0204809 A1 | 7/2014 | Kim et al. |
| 2015/0009948 A1 | 1/2015 | Raaf et al. |
| (Continued) | | |

FOREIGN PATENT DOCUMENTS

| | | |
|---|---|---|
| CN | 103748801 A | 4/2014 |
| CN | 104113387 A | 10/2014 |
| (Continued) | | |

OTHER PUBLICATIONS

Office Action issued in Chinese Application No. 2016103218144 dated Dec. 13, 2019, 14 pages (with English translation).
(Continued)

*Primary Examiner* — Eric Myers
(74) *Attorney, Agent, or Firm* — Fish & Richardson P.C.

(57) ABSTRACT

An embodiment of this application provides a synchronization signal transmitting method. The method includes: configuring, by a base station, one or more groups of synchronization signals, where each group of synchronization signals is mapped to N PRBs and occupies multiple symbols in time domain, and N is a positive integer greater than or equal to 1; and transmitting, by the base station, the one or more groups of synchronization signals. In comparison with the prior art, PSD of a synchronization signal can be increased, and coverage of the synchronization signal can be ensured.

19 Claims, 12 Drawing Sheets

(51) Int. Cl.
*H04W 16/28* (2009.01)
*H04B 7/0452* (2017.01)
*H04L 27/26* (2006.01)

(52) U.S. Cl.
CPC ......... *H04L 27/2605* (2013.01); *H04W 16/28* (2013.01); *H04W 56/00* (2013.01)

(56) References Cited

U.S. PATENT DOCUMENTS

| | | | |
|---|---|---|---|
| 2016/0212631 | A1 | 7/2016 | Shen et al. |
| 2016/0308637 | A1* | 10/2016 | Frenne .................. H04L 5/0048 |
| 2017/0201304 | A1 | 7/2017 | Kim |

FOREIGN PATENT DOCUMENTS

| | | |
|---|---|---|
| CN | 105409301 A | 3/2016 |
| CN | 105474716 A | 4/2016 |
| CN | 105493547 A | 4/2016 |
| EP | 2988431 B1 | 2/2016 |
| WO | 2015080646 A1 | 6/2015 |
| WO | 2015090828 A1 | 6/2015 |
| WO | 2015109433 A1 | 7/2015 |

OTHER PUBLICATIONS

Search Report issued in Chinese Application No. 201610321814.4 dated Dec. 5, 2019, 2 pages.
3GPP TR 25.814 V7.1.0 (Sep. 2006),3rd Generation Partnership Project;Technical Specification Group Radio Access Network;Physical layer aspects for evolved Universal Terrestrial Radio Access (UTRA)(Release 7),total 132 pages.
3GPP TR 38.913 V0.3.0 (Mar. 2016),3rd Generation Partnership Project;Technical Specification Group Radio Access Network;Study on Scenarios and Requirements for Next Generation Access Technologies;(Release 14),total 30 pages.
International Search Report and Written Opinion issued in International Application No. PCT/CN2017/091650 dated Jun. 30, 2017, 21 pages.
XP051039879 R1-156528 Intel Corporation,"On synchronization signal design and performance for NB-IoT",3GPP TSG RAN WG1 Meeting #83,Anaheim, USA, Nov. 16-20, 2015,total 11 pages.
Extended European Search Report issued in European Application No. 17795422.9 dated Mar. 20, 2019, 45 pages.

* cited by examiner

| B1 PSS- Long SSS- Long | B1 PSS- Long SSS- Long | B1 PSS- Long SSS- Long | B1 PSS- Long SSS- Long | B1 PSS- Long SSS- Long | B1 PSS- Long SSS- Long |
|---|---|---|---|---|---|
| B2 PSS- Long SSS- Long | B2 PSS- Long SSS- Long | B2 PSS- Long SSS- Long | B2 PSS- Long SSS- Long | B2 PSS- Long SSS- Long | B2 PSS- Long SSS- Long |
| B3 PSS- Long SSS- Long | B3 PSS- Long SSS- Long | B3 PSS- Long SSS- Long | B3 PSS- Long SSS- Long | B3 PSS- Long SSS- Long | B3 PSS- Long SSS- Long |
| B4 PSS- Long SSS- Long | B4 PSS- Long SSS- Long | B4 PSS- Long SSS- Long | B4 PSS- Long SSS- Long | B4 PSS- Long SSS- Long | B4 PSS- Long SSS- Long |
| B5 PSS- Long SSS- Long | B5 PSS- Long SSS- Long | B5 PSS- Long SSS- Long | B5 PSS- Long SSS- Long | B5 PSS- Long SSS- Long | B5 PSS- Long SSS- Long |
| B6 PSS- Long SSS- Long | B6 PSS- Long SSS- Long | B6 PSS- Long SSS- Long | B6 PSS- Long SSS- Long | B6 PSS- Long SSS- Long | B6 PSS- Long SSS- Long |

FIG. 12

| B1 PSS- Short SSS- Long | B1 PSS- Short SSS- Long | B1 PSS- Short SSS- Long | B1 PSS- Short SSS- Long | B1 PSS- Short SSS- Long | B1 PSS- Short SSS- Long |
|---|---|---|---|---|---|
| B2 PSS- Short SSS- Long | B2 PSS- Short SSS- Long | B2 PSS- Short SSS- Long | B2 PSS- Short SSS- Long | B2 PSS- Short SSS- Long | B2 PSS- Short SSS- Long |
| B3 PSS- Short SSS- Long | B3 PSS- Short SSS- Long | B3 PSS- Short SSS- Long | B3 PSS- Short SSS- Long | B3 PSS- Short SSS- Long | B3 PSS- Short SSS- Long |
| B4 PSS- Short SSS- Long | B4 PSS- Short SSS- Long | B4 PSS- Short SSS- Long | B4 PSS- Short SSS- Long | B4 PSS- Short SSS- Long | B4 PSS- Short SSS- Long |
| B5 PSS- Short SSS- Long | B5 PSS- Short SSS- Long | B5 PSS- Short SSS- Long | B5 PSS- Short SSS- Long | B5 PSS- Short SSS- Long | B5 PSS- Short SSS- Long |
| B6 PSS- Short SSS- Long | B6 PSS- Short SSS- Long | B6 PSS- Short SSS- Long | B6 PSS- Short SSS- Long | B6 PSS- Short SSS- Long | B6 PSS- Short SSS- Long |

FIG. 13

| B1 PSS- Long SSS- Short | B1 PSS- Long SSS- Short | B1 PSS- Long SSS- Short | B1 PSS- Long SSS- Short | B1 PSS- Long SSS- Short | B1 PSS- Long SSS- Short |
|---|---|---|---|---|---|
| B2 PSS- Long SSS- Short | B2 PSS- Long SSS- Short | B2 PSS- Long SSS- Short | B2 PSS- Long SSS- Short | B2 PSS- Long SSS- Short | B2 PSS- Long SSS- Short |
| B3 PSS- Long SSS- Short | B3 PSS- Long SSS- Short | B3 PSS- Long SSS- Short | B3 PSS- Long SSS- Short | B3 PSS- Long SSS- Short | B3 PSS- Long SSS- Short |
| B4 PSS- Long SSS- Short | B4 PSS- Long SSS- Short | B4 PSS- Long SSS- Short | B4 PSS- Long SSS- Short | B4 PSS- Long SSS- Short | B4 PSS- Long SSS- Short |
| B5 PSS- Long SSS- Short | B5 PSS- Long SSS- Short | B5 PSS- Long SSS- Short | B5 PSS- Long SSS- Short | B5 PSS- Long SSS- Short | B5 PSS- Long SSS- Short |
| B6 PSS- Long SSS- Short | B6 PSS- Long SSS- Short | B6 PSS- Long SSS- Short | B6 PSS- Long SSS- Short | B6 PSS- Long SSS- Short | B6 PSS- Long SSS- Short |

FIG. 14

| B1 PSS- Short SSS- Short | B1 PSS- Short SSS- Short | B1 PSS- Short SSS- Short | B1 PSS- Short SSS- Short | B1 PSS- Short SSS- Short | B1 PSS- Long SSS- Short |
|---|---|---|---|---|---|
| B2 PSS- Short SSS- Short | B2 PSS- Short SSS- Short | B2 PSS- Short SSS- Short | B2 PSS- Short SSS- Short | B2 PSS- Short SSS- Short | B2 PSS- Long SSS- Short |
| B3 PSS- Short SSS- Short | B3 PSS- Short SSS- Short | B3 PSS- Short SSS- Short | B3 PSS- Short SSS- Short | B3 PSS- Short SSS- Short | B3 PSS- Long SSS- Short |
| B4 PSS- Short SSS- Short | B4 PSS- Short SSS- Short | B4 PSS- Short SSS- Short | B4 PSS- Short SSS- Short | B4 PSS- Short SSS- Short | B4 PSS- Short SSS- Short |
| B5 PSS- Short SSS- Short | B5 PSS- Short SSS- Short | B5 PSS- Short SSS- Short | B5 PSS- Short SSS- Short | B5 PSS- Short SSS- Short | B5 PSS- Short SSS- Short |
| B6 PSS- Short SSS- Short | B6 PSS- Short SSS- Short | B6 PSS- Short SSS- Short | B6 PSS- Short SSS- Short | B6 PSS- Short SSS- Short | B6 PSS- Short SSS- Short |

FIG. 15

| B1<br>PSS- Long<br>SSS- Long | B6<br>PSS- Long<br>SSS- Long | B5<br>PSS- Long<br>SSS- Long | B4<br>PSS- Long<br>SSS- Long | B3<br>PSS- Long<br>SSS- Long | B2<br>PSS- Long<br>SSS- Long |
|---|---|---|---|---|---|
| B2<br>PSS- Long<br>SSS- Long | B1<br>PSS- Long<br>SSS- Long | B6<br>PSS- Long<br>SSS- Long | B5<br>PSS- Long<br>SSS- Long | B4<br>PSS- Long<br>SSS- Long | B3<br>PSS- Long<br>SSS- Long |
| B3<br>PSS- Long<br>SSS- Long | B2<br>PSS- Long<br>SSS- Long | B1<br>PSS- Long<br>SSS- Long | B6<br>PSS- Long<br>SSS- Long | B5<br>PSS- Long<br>SSS- Long | B4<br>PSS- Long<br>SSS- Long |
| B4<br>PSS- Long<br>SSS- Long | B3<br>PSS- Long<br>SSS- Long | B2<br>PSS- Long<br>SSS- Long | B1<br>PSS- Long<br>SSS- Long | B6<br>PSS- Long<br>SSS- Long | B5<br>PSS- Long<br>SSS- Long |
| B5<br>PSS- Long<br>SSS- Long | B4<br>PSS- Long<br>SSS- Long | B3<br>PSS- Long<br>SSS- Long | B2<br>PSS- Long<br>SSS- Long | B1<br>PSS- Long<br>SSS- Long | B6<br>PSS- Long<br>SSS- Long |
| B6<br>PSS- Long<br>SSS- Long | B5<br>PSS- Long<br>SSS- Long | B4<br>PSS- Long<br>SSS- Long | B3<br>PSS- Long<br>SSS- Long | B2<br>PSS- Long<br>SSS- Long | B1<br>PSS- Long<br>SSS- Long |

FIG. 16

| B1<br>PSS- Short<br>SSS- Long | B6<br>PSS- Short<br>SSS- Long | B5<br>PSS- Short<br>SSS- Long | B4<br>PSS- Short<br>SSS- Long | B3<br>PSS- Short<br>SSS- Long | B2<br>PSS- Short<br>SSS- Long |
|---|---|---|---|---|---|
| B2<br>PSS- Short<br>SSS- Long | B1<br>PSS- Short<br>SSS- Long | B6<br>PSS- Short<br>SSS- Long | B5<br>PSS- Short<br>SSS- Long | B4<br>PSS- Short<br>SSS- Long | B3<br>PSS- Short<br>SSS- Long |
| B3<br>PSS- Short<br>SSS- Long | B2<br>PSS- Short<br>SSS- Long | B1<br>PSS- Short<br>SSS- Long | B6<br>PSS- Short<br>SSS- Long | B5<br>PSS- Short<br>SSS- Long | B4<br>PSS- Short<br>SSS- Long |
| B4<br>PSS- Short<br>SSS- Long | B3<br>PSS- Short<br>SSS- Long | B2<br>PSS- Short<br>SSS- Long | B1<br>PSS- Short<br>SSS- Long | B6<br>PSS- Short<br>SSS- Long | B5<br>PSS- Short<br>SSS- Long |
| B5<br>PSS- Short<br>SSS- Long | B4<br>PSS- Short<br>SSS- Long | B3<br>PSS- Short<br>SSS- Long | B2<br>PSS- Short<br>SSS- Long | B1<br>PSS- Short<br>SSS- Long | B6<br>PSS- Short<br>SSS- Long |
| B6<br>PSS- Short<br>SSS- Long | B5<br>PSS- Short<br>SSS- Long | B4<br>PSS- Short<br>SSS- Long | B3<br>PSS- Short<br>SSS- Long | B2<br>PSS- Short<br>SSS- Long | B1<br>PSS- Short<br>SSS- Long |

FIG. 17

| B1 PSS-Long SSS-Short | B6 PSS-Long SSS-Short | B5 PSS-Long SSS-Short | B4 PSS-Long SSS-Short | B3 PSS-Long SSS-Short | B2 PSS-Long SSS-Short |
|---|---|---|---|---|---|
| B2 PSS-Long SSS-Short | B1 PSS-Long SSS-Short | B6 PSS-Long SSS-Short | B5 PSS-Long SSS-Short | B4 PSS-Long SSS-Short | B3 PSS-Long SSS-Short |
| B3 PSS-Long SSS-Short | B2 PSS-Long SSS-Short | B1 PSS-Long SSS-Short | B6 PSS-Long SSS-Short | B5 PSS-Long SSS-Short | B4 PSS-Long SSS-Short |
| B4 PSS-Long SSS-Short | B3 PSS-Long SSS-Short | B2 PSS-Long SSS-Short | B1 PSS-Long SSS-Short | B6 PSS-Long SSS-Short | B5 PSS-Long SSS-Short |
| B5 PSS-Long SSS-Short | B4 PSS-Long SSS-Short | B3 PSS-Long SSS-Short | B2 PSS-Long SSS-Short | B1 PSS-Long SSS-Short | B6 PSS-Long SSS-Short |
| B6 PSS-Long SSS-Short | B5 PSS-Long SSS-Short | B4 PSS-Long SSS-Short | B3 PSS-Long SSS-Short | B2 PSS-Long SSS-Short | B1 PSS-Long SSS-Short |

FIG. 18

| B1 PSS-Short SSS-Short | B6 PSS-Short SSS-Short | B5 PSS-Short SSS-Short | B4 PSS-Short SSS-Short | B3 PSS-Short SSS-Short | B2 PSS-Short SSS-Short |
|---|---|---|---|---|---|
| B2 PSS-Short SSS-Short | B1 PSS-Short SSS-Short | B6 PSS-Short SSS-Short | B5 PSS-Short SSS-Short | B4 PSS-Short SSS-Short | B3 PSS-Short SSS-Short |
| B3 PSS-Short SSS-Short | B2 PSS-Short SSS-Short | B1 PSS-Short SSS-Short | B6 PSS-Short SSS-Short | B5 PSS-Short SSS-Short | B4 PSS-Short SSS-Short |
| B4 PSS-Short SSS-Short | B3 PSS-Short SSS-Short | B2 PSS-Short SSS-Short | B1 PSS-Short SSS-Short | B6 PSS-Short SSS-Short | B5 PSS-Short SSS-Short |
| B5 PSS-Short SSS-Short | B4 PSS-Short SSS-Short | B3 PSS-Short SSS-Short | B2 PSS-Short SSS-Short | B1 PSS-Short SSS-Short | B6 PSS-Short SSS-Short |
| B6 PSS-Short SSS-Short | B5 PSS-Short SSS-Short | B4 PSS-Short SSS-Short | B3 PSS-Short SSS-Short | B2 PSS-Short SSS-Short | B1 PSS-Short SSS-Short |

FIG. 19

SYNCHRONIZATION SIGNAL TRANSMITTING OR RECEIVING METHOD, BASE STATION, AND USER EQUIPMENT

CROSS-REFERENCE TO RELATED APPLICATIONS

This application is a continuation of International Application PCT/CN2017/081650, filed on Apr. 24, 2017, which claims priority to Chinese Patent Application No. 201610321814.4, filed on May 12, 2016. The disclosures of the aforementioned applications are hereby incorporated by reference in their entireties.

TECHNICAL FIELD

Embodiments of this application relate to the field of communications technologies, and in particular, to a synchronization signal transmitting or receiving method, a base station, and user equipment.

BACKGROUND

As future communication develops toward a 5th Generation (5G) wireless communications system, importance also begins to be attached to an massive multiple-input multiple-output (M-MIMO) technology. Compared with a conventional multiple-input multiple-output (MIMO) technology, the M-MIMO technology has advantages such as relatively simple allocation of radio resources, not requiring a rich scattering environment, and capable of providing services for cheap single-antenna users.

In comparison with an earlier communications system, with respect to application scenarios and system parameters in the 5G communications system, parameters such as a carrier frequency and a system bandwidth in the 5G communications system may increase. However, with the increase of the carrier frequency and the bandwidth, a propagation loss and a penetration loss are caused, and consequently power spectrum density (PSD) of a synchronization signal is reduced. Because of the changes, a signal-to-noise ratio of the received synchronization signal is reduced, and coverage of the synchronization signal is affected.

SUMMARY

An embodiment of this application provides a synchronization signal transmitting method to increase PSD of an existing synchronization signal.

In addition, a synchronization signal receiving method is provided to increase PSD of an existing synchronization signal.

In addition, a base station is provided to increase PSD of an existing synchronization signal.

In addition, user equipment is provided to increase PSD of an existing synchronization signal.

According to a first aspect of the present invention, a synchronization signal transmitting method is provided and includes:

configuring, by a base station, one or more groups of synchronization signals, where each group of synchronization signals is mapped to N physical resource block (PRBs) and occupies multiple symbols in time domain, and N is a positive integer greater than or equal to 1; and transmitting, by the base station, the one or more groups of synchronization signals.

According to a second aspect of the present invention, a base station is provided and includes:

a processor, configured to configure one or more groups of synchronization signals, where each group of synchronization signals is mapped to N PRBs and occupies multiple symbols in time domain, and N is a positive integer greater than or equal to 1; and a transmitter, configured to transmit the one or more groups of synchronization signals.

According to a third aspect of the present invention, a synchronization signal receiving method is provided and includes:

receiving, by user equipment, one or more groups of synchronization signals from a base station, where each group of synchronization signals is mapped to N PRBs and occupies multiple symbols in time domain, and N is a positive integer greater than or equal to 1; and completing, by the user equipment according to one group in the one of more groups of synchronization signals, synchronization with a cell in which the base station is located.

According to a fourth aspect of the present invention, user equipment is provided and includes:

a receiver, configured to receive one or more groups of synchronization signals from a base station, where each group of synchronization signals is mapped to N PRBs and occupies multiple symbols in time domain, and N is a positive integer greater than or equal to 1; and a processor, configured to complete, according to one group in the one of more groups of synchronization signals, synchronization with a cell in which the base station is located.

In the foregoing aspects, each group of synchronization signals includes a PSS and an SSS, and the PSS and the SSS are mapped to the N PRBs, where in time domain, the PSS occupies $P_1$ symbols, the SSS occupies $P_2$ symbols, N is a positive integer greater than or equal to 1, and $P_1$ and $P_2$ are both positive integers.

Optionally, each group of synchronization signals occupies a same frequency domain resource on different symbols.

Optionally, each group of synchronization signals occupies different frequency domain resources on different symbols.

Optionally, when there are multiple groups of synchronization signals, the synchronization signals in different groups correspond to different spatial resources, and each group of synchronization signals is transmitted by using a different beam.

Optionally, each group of synchronization signals is transmitted in a horizontal direction by using a wide beam, and transmitted in a vertical direction by using a narrow beam.

According to the technical solutions provided by the embodiments of the present invention, one or more groups of synchronization signals whose structures are different from those in the prior art are configured, and different spatial resources corresponding to the one or more groups of synchronization signals are configured and used, so that the synchronization signals are transmitted by using corresponding beams. In comparison with the prior art, PSD of a synchronization signal can be increased, and coverage of the synchronization signal can be ensured.

BRIEF DESCRIPTION OF DRAWINGS

To describe the technical solutions in the embodiments of this application more clearly, the following briefly describes the accompanying drawings required for describing the embodiments or the prior art. Apparently, the accompanying drawings in the following description show merely some embodiments of this application, and a person of ordinary skill in the art may derive other drawings from these accompanying drawings without creative efforts.

FIG. 12 is a schematic resource mapping diagram for six groups of synchronization signals according to an embodiment of the present invention;

FIG. 13 is a schematic resource mapping diagram for six groups of synchronization signals according to another embodiment of the present invention;

FIG. 14 is a schematic resource mapping diagram for six groups of synchronization signals according to another embodiment of the present invention;

FIG. 15 is a schematic resource mapping diagram for six groups of synchronization signals according to another embodiment of the present invention;

FIG. 16 is a schematic resource mapping diagram for six groups of synchronization signals according to another embodiment of the present invention;

FIG. 17 is a schematic resource mapping diagram for six groups of synchronization signals according to another embodiment of the present invention;

FIG. 18 is a schematic resource mapping diagram for six groups of synchronization signals according to another embodiment of the present invention;

FIG. 19 is a schematic resource mapping diagram for six groups of synchronization signals according to another embodiment of the present invention;

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

With continuous development of communications theory and practice, more wireless communications technologies emerge and gradually become mature. The wireless communications technologies include but are not limited to a Time Division Multiple Access (TDMA) technology, a Frequency Division Multiple Access (FDMA) technology, a Code Division Multiple Access (CDMA) technology, a Time Division-Synchronous Code Division Multiple Access (TD-SCDMA) technology, an Orthogonal Frequency Division Multiple Access (OFDMA) technology, a Single Carrier Frequency Division Multiple Access (SC-FDMA) technology, a Space Division Multiple Access (SDMA) technology, technologies evolved and derived from the technologies, and the like. As radio access technologies (RAT), the wireless communications technologies are used in many wireless communications standards to construct various wireless communications systems (or networks) well known by people today, including but not limited to a Global System for Mobile Communications (GSM), CDMA2000 system, Wideband CDMA (WCDMA) system, Wi-Fi defined in the 802.11 series standards, Worldwide Interoperability for Microwave Access (WiMAX) system, Long Term Evolution (LTE) system, LTE-Advanced (LTE-A) system, systems evolved from the wireless communications systems, and the like. Unless otherwise specified, the technical solutions provided by the embodiments of the present invention may be applied to the foregoing wireless communications technologies and wireless communications systems, and a future communications system, for example, a 5G communications system or a communications system after 5G. In addition, terms "system" and "network" are interchangeable.

Figure 1:
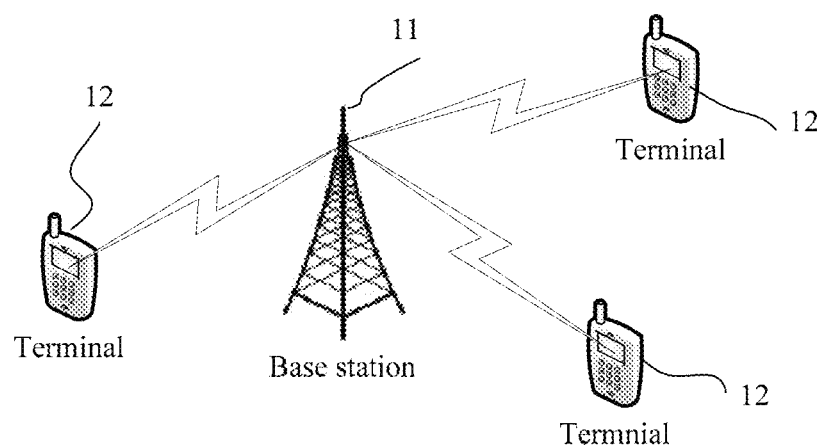
FIG. 1 is a schematic diagram of a wireless communications system according to an embodiment of the present invention.

FIG. 1 is an illustrative schematic diagram of a wireless communications network 10 according to an embodiment of the present invention. As shown in FIG. 1, the wireless communications network 10 includes a base station 11 and user equipment 12. The user equipment 12 may communicate with the base station 11 by using a radio link.

Depending on a used wireless communications technology, the base station may also be referred to as a NodeB, an evolved NodeB (eNodeB), an access point (AP), or the like. In addition, according to sizes of provided service coverage areas, base stations may be classified into a macro base station providing a macro cell, a micro base station providing a pico cell, and a femto base station providing a femto cell. With continuous evolution of the wireless communications technology, a future base station may also use another name.

The user equipment (UE) may be various wireless communications devices having wireless communication functions, for example, including but not limited to a mobile cellular phone, a cordless telephone set, a personal digital assistant (PDA), a smartphone, a notebook computer, a tablet computer, a wireless data card, a wireless modulator demodulator (Modem), or a wearable device such as a smart watch. With emergence of an Internet of Things (IoT) technology, more devices that previously have no communication function, for example, including but not limited to a household appliance, a vehicle, a tool device, a service device, and a service facility, begin to obtain wireless communication functions by configuring wireless communications units, and therefore can access a wireless communications network and accept remote control. Because the wireless communications units are configured for the devices, the devices have the wireless communication functions, and also fall within the scope of wireless communications devices. In addition, the user equipment may also be referred to as a mobile station, a mobile device, a mobile terminal, a wireless terminal, a handheld device, a client, or the like.

Multiple antennas may be configured for both the base station and the user equipment to support a MIMO technology. Further, the user equipment may not only support single-user MIMO (SU-MIMO), but also support multi-user MIMO (MU-MIMO) by using an SDMA technology. Because multiple antennas are configured, the base station and the user equipment may further flexibly support a single input single output (SISO) technology, and single input multiple output (SIMO) and multiple input single output (MISO) technologies, where SIMO is also referred to as receive diversity (RD), and MISO is also referred to as transmit diversity (TD).

In addition, the base station and the user equipment may perform communication by using various wireless communications technologies, for example, including but not limited to the wireless communications technologies mentioned above.

If the UE needs to access the wireless communications network, a cell search process is required. Using an LTE system as an example, to support cell search, LTE system defines two downlink synchronization signals: a primary synchronization signal (PSS) and an secondary synchronization signal (SSS).

It should be noted that the wireless communications network 10 shown in FIG. 1 is used merely as an example but not intended to limit the technical solution of the present invention. A person skilled in the art should understand that, in a specific implementation process, the wireless communications network 10 further includes other devices, for example, including but not limited to a base station controller (BSC). In addition, the base station and the user equipment may be configured according to specific requirements.

In an implementation of the present invention, high power spectrum density is obtained by setting a synchronization signal mapping rule for a beam. Further, coverage of the base station is also ensured by setting multiple beams having different coverage and setting corresponding synchronization signal mapping rules.

Figure 2:
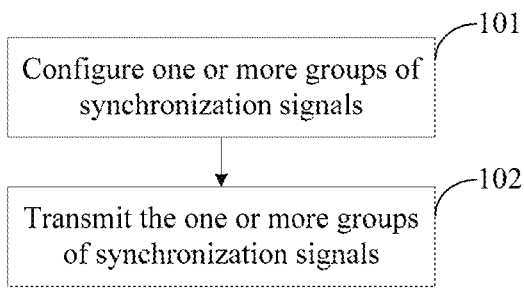
FIG. 2 is a schematic flowchart of a synchronization signal transmitting method according to an embodiment of the present invention.

Referring to FIG. 2, FIG. 2 is a schematic flowchart of a synchronization signal transmitting method according to an implementation of the present invention. The synchronization signal transmitting method is performed by a base station. The transmitting method includes the following steps.

Step 101: A base station configures one or more groups of synchronization signals. Each group of synchronization signals is mapped to N PRBs and occupies multiple symbols in time domain, and N is a positive integer greater than or equal to 1. Specifically, a group of synchronization signals includes a PSS and an SSS. In frequency domain, the base station configures a PSS and an SSS in each group of synchronization signals to map to the N PRBs. In different implementations, each group of synchronization signals occupies a same frequency domain resource on different symbols, or each group of synchronization signals occupies different frequency domain resources on different symbols. In time domain, the base station configures the PSS to occupy $P_1$ symbols, and the SSS to occupy $P_2$ symbols. $P_1$ and $P_2$ are both positive integers.

Step 102: The base station transmits the configured one or more groups of synchronization signals.

Figure 3:
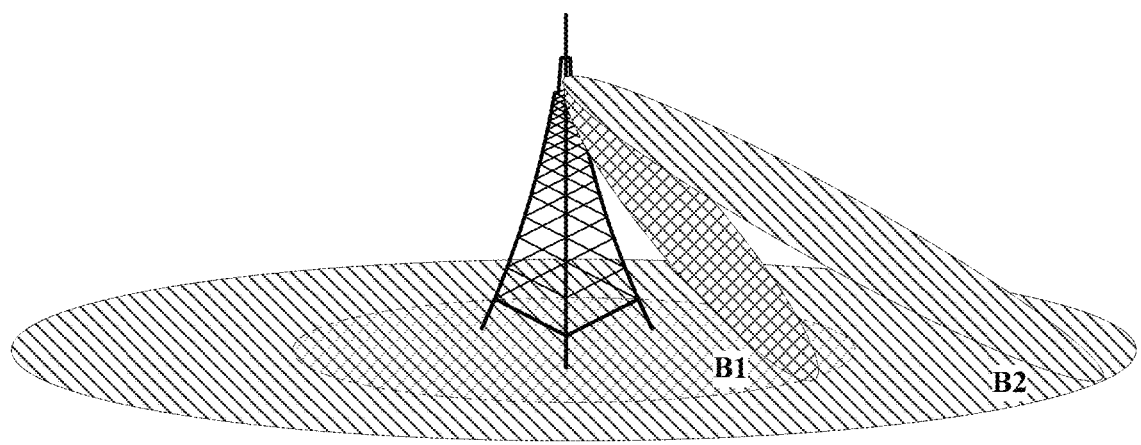
FIG. 3 is a schematic diagram of coverage of two beams according to an embodiment of the present invention.

Specifically, when there is one group of synchronization signals, the base station transmits the synchronization signals by using one beam. When there are multiple groups of synchronization signals, the synchronization signals in different groups correspond to different spatial resources, and each group of synchronization signals is transmitted by using a different beam. Referring to FIG. 3, FIG. 3 is a schematic diagram of coverage of two beams B1 and B2. The beams B1 and B2 are distinguished in a vertical direction and correspond to different spatial resources, and different coverage is formed. In this way, with respect to beams used to transmit synchronization signals, a wide beam is formed in a horizontal direction to ensure omnidirectional coverage, and a narrow beam is formed in a vertical direction, so that transmit power is concentrated in a limited spatial range to obtain a beamforming gain. When there are more than two beams, a coverage principle thereof is similar to a coverage principle of two beams. Details are not further described hereinafter.

According to the technical solution provided by this embodiment of the present invention, one or more groups of synchronization signals whose structures are different from those in the prior art are configured, and different spatial resources corresponding to the one or more groups of synchronization signals are configured and used, so that the synchronization signals are transmitted by using corresponding beams. In comparison with the prior art, PSD of a synchronization signal can be increased, and coverage of the synchronization signal can be ensured.

Figure 4:
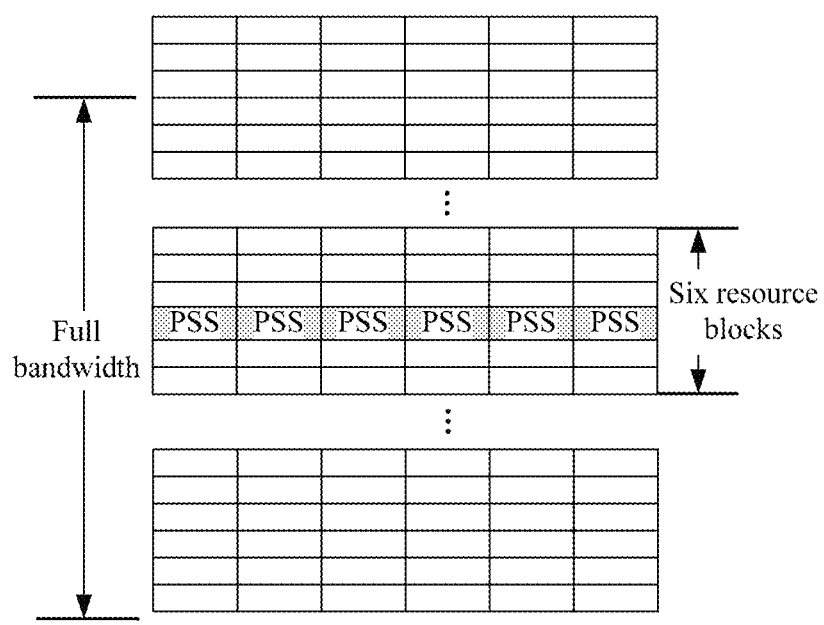
FIG. 4 is a schematic resource mapping diagram for a group of synchronization signals in frequency domain according to an embodiment of the present invention.
Figure 5:
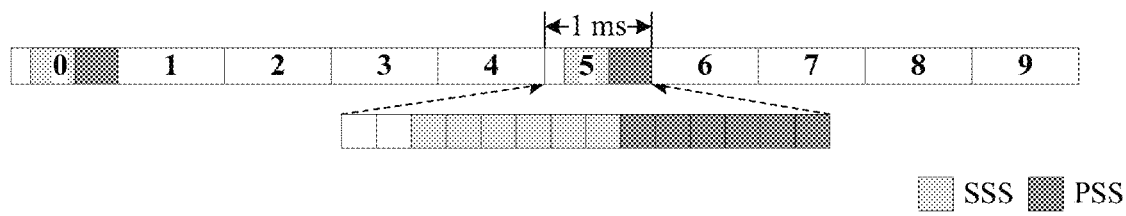
FIG. 5 is a schematic resource mapping diagram for a group of synchronization signals in time domain according to an embodiment of the present invention.

Referring to FIG. 4 and FIG. 5, FIG. 4 is a resource mapping diagram for a group of synchronization signals that is configured by the base station in frequency domain, and FIG. 5 is a resource mapping diagram for a group of synchronization signals in time domain. It is assumed that the group of synchronization signals corresponds to the beam B1. As shown in FIG. 4, in frequency domain, the base station configures a PSS and an SSS in a group of synchronization signals to map to a same frequency domain resource (only a mapping of the PSS is shown in the figure, and a mapping of the SSS is similar to this). As shown in FIG. 5, in time domain, the PSS occupies six symbols, and the SSS occupies six symbols. For example, the synchronization signals are transmitted periodically, and transmitted twice in each 10 ms radio frame. In other implementations, the synchronization signals may also be transmitted according to other periods, and start positions of the PSS and the SSS may also be different. On different symbols, the PSS and the SSS occupy a same PRB. It should be noted that, in this implementation, the PSS is located after the SSS. In other implementations, the PSS may also be located before the SSS. This is not limited herein. The base station transmits the group of synchronization signals by using a beam B1.

Figure 6:
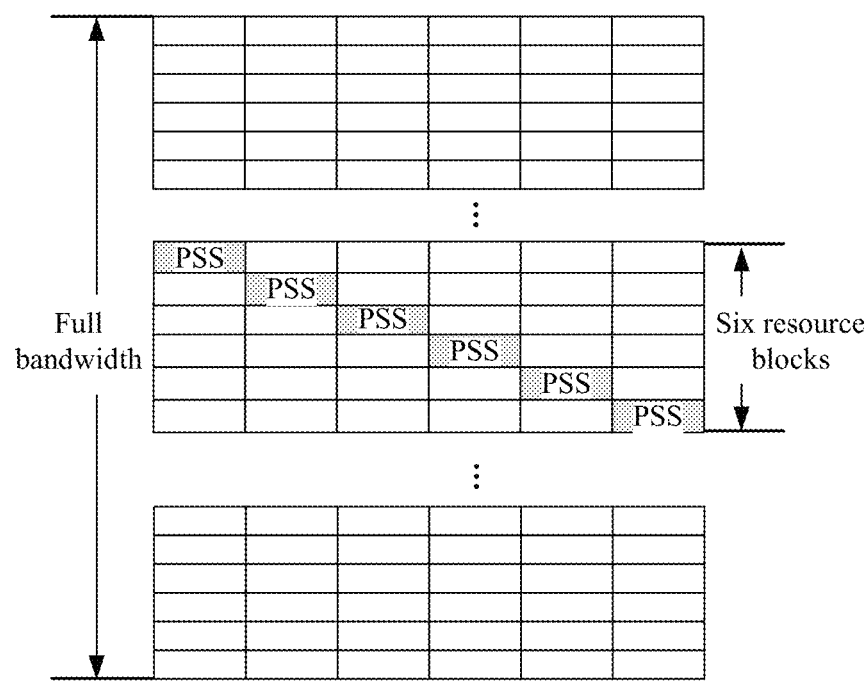
FIG. 6 is a schematic resource mapping diagram for a group of synchronization signals in frequency domain according to another embodiment of the present invention.

In other implementations, referring to FIG. 6, in comparison with different symbols, the PSS and the SSS may occupy different PRBs in frequency domain.

Figure 7:
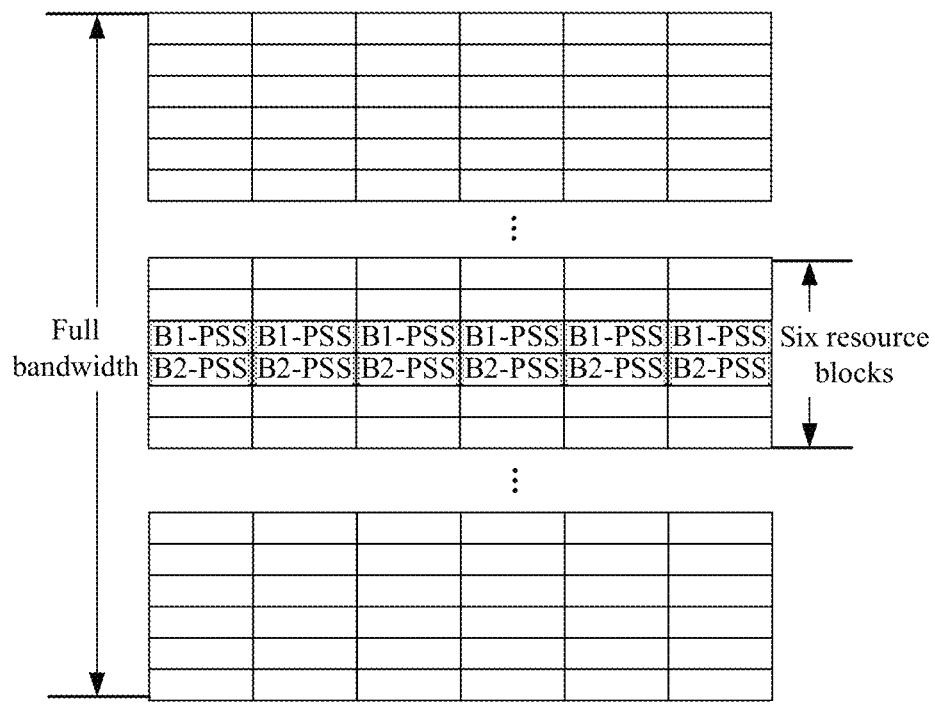
FIG. 7 is a schematic resource mapping diagram for two groups of synchronization signals in frequency domain according to another embodiment of the present invention.

Referring to FIG. 7, FIG. 7 is a resource mapping diagram for two groups of synchronization signals configured by the base station in frequency domain. It is assumed that the two groups of synchronization signals correspond to beams B1 and B2. In frequency domain, the base station configures a PSS of the beam B1 to map to one PRB (only a mapping of the PSS is shown in the figure, and a mapping of an SSS is similar to this), and configures an SSS of the beam B1 to map to the same PRB as the PSS of the beam B1. The base station configures a PSS of the beam B2 to map to a PRB different from that of the beam B1, and configures an SSS of the beam B2 to map to the same PRB as the PSS of the B2. In time domain (not shown in the figure), the base station configures the PSSs of the beam B1 and the beam B2 to occupy six symbols respectively, and the SSSs thereof to occupy six symbols respectively. On different symbols, the PSS and the SSS of the beam B1 occupy a same PRB. After the foregoing configuration is completed, the base station transmits one group of synchronization signals by using the beam B1, and transmits another group of synchronization signals by using the beam B2.

The PSS and the SSS may use a long sequence or a short sequence. When a long sequence is used, the long sequence is split into several parts, where each part is mapped to one of multiple symbols occupied by the PSS or the SSS in time domain, and synchronization performance is relatively good. When a short sequence is used, each short sequence occupies one of multiple symbols occupied by the PSS or the SSS and is repeated in time domain, and a synchronization time is relatively short. However, it should be noted that, the PSS and the SSS may use both a long sequence or a short sequence, or the SSS may use a short sequence when the PSS uses a long sequence, or the SSS may use a long sequence when the PSS uses a short sequence. This is not limited herein.

The PSS and the SSS provided by this embodiment of the present invention are generated by using a "Zadoff-Chu" sequence. The following describes in detail a process of generating a PSS and an SSS with reference to FIG. 8 and FIG. 9. The following illustrates a sequence generation method to describe a process of generating a PSS and an SSS. A person skilled in the art should understand that, the methods are used merely as examples but are not intended to limit the scope of the present invention. In a specific implementation process, other methods may also be used to determine the PSS and the SSS.

Figure 8:
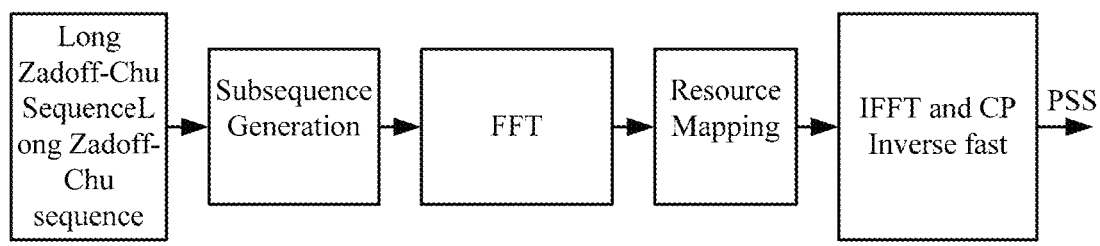
FIG. 8 is a schematic diagram of a process of generating a long sequence of a PSS according to an embodiment of the present invention.

Referring to FIG. 8, a process of generating a PSS is described first. As described above, the PSS occupies six symbols, each symbol is 12 subcarriers, and there are 72 resource elements (REs) in total. First, a ZC sequence is generated based on a sequence number u, and then is supplemented to 72 REs. After subsequence generation, a long sequence is split into six subsequences, where each subsequence includes 12 REs. After fast Fourier transform (FFT), subcarrier mapping, and inverse fast Fourier transform (IFFT) are respectively performed on the generated subsequences, a cyclic prefix is added, and six subsequences used for the PSS are output, where each subsequence corresponds to six symbols, where $$c_u(n) = e^{-\frac{j\pi u n(n+1)}{71}}, n = \{0, 1, 2, \ldots, 70\}, \text{ and}$$

$$d_u(n+1) = d_u(n)c_u(n), n = \{0, 1, 2, \ldots, 70\}, d_u(0) = 1.$$

Figure 9:
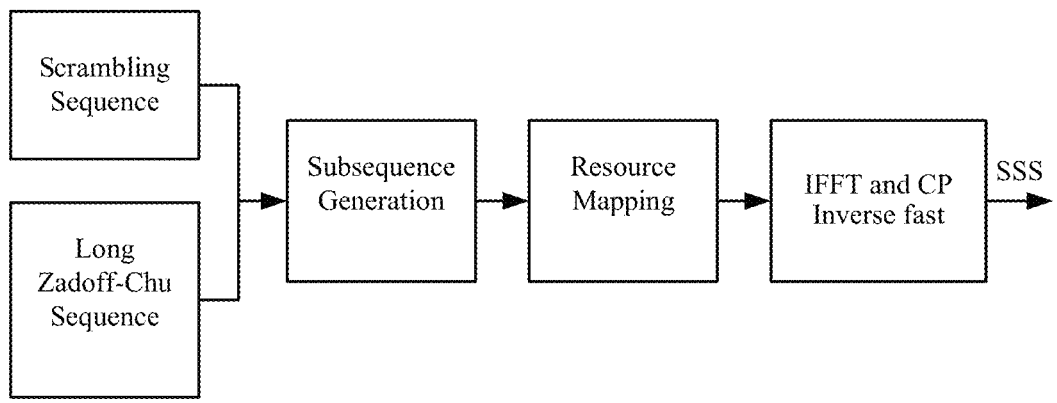
FIG. 9 is a schematic diagram of a process of generating a long sequence of an SSS according to an embodiment of the present invention.

Referring to FIG. 9, a process of generating an SSS is described. As described above, the SSS occupies six symbols, each symbol is 12 subcarriers, and there are 72 REs in total. First, a ZC sequence with a length of 71 is generated based on a sequence number p, a scrambling code sequence with a length of 71 is generated based on a sequence number q, and array elements in the generated ZC sequence are multiplied by those in the scrambling code sequence sequentially. After subsequence generation, the generated sequence is split into six subsequences. After subcarrier matching, IFFT, and a CP are respectively added on each subsequence, six subsequences used for the SSS are output, where each subsequence corresponds to six symbols, where $$a_p(n) = e^{-\frac{j\pi m_p n(n+1)}{71}} c_{k_p}(n), n = \{0, 1, 2, \ldots, 70\}.$$

In the foregoing formula, $m_p = 1 + \text{mod}(p, 71)$ $$k_p = \left\lfloor \frac{p}{71} \right\rfloor,$$

$c_{k_p}(n)$ is a M sequence, and different $k_p$ values correspond to different sequences, where $$b_q = b(\text{mod}(n - l_q)), n = \{0, 1, 2, \ldots, 70\}, q = \{0, 1, 2, \ldots, 5\}.$$

In the foregoing formula, $b(n+6) = \text{mod}(b(n) + b(n+1), 2)$, $n = \{0, 1, \ldots, 65\}$, $b(0) = 1$, $b(m) = 0$, $m = \{1, 2, 3, 4, 5\}$, and $l_0 = 0$; $l_1 = 17$; $l_2 = 3$; $l_3 = 23$; $l_4 = 7$; $l_5 = 29$.

Figure 10:
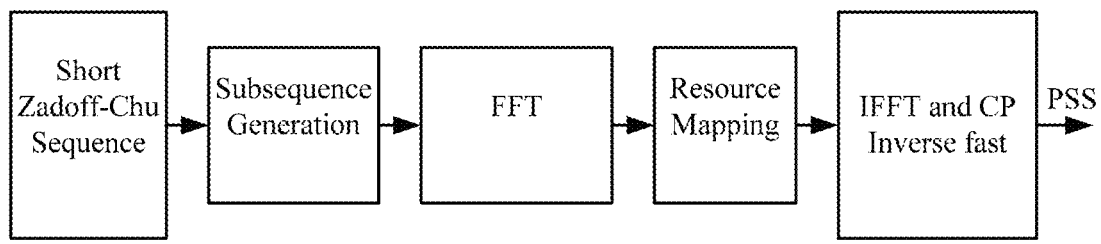
FIG. 10 is a schematic diagram of a process of generating a short sequence of a PSS according to an embodiment of the present invention.

Referring to FIG. 10, FIG. 10 is a schematic diagram of a process of generating a short sequence used by a PSS. As described above, each short sequence corresponds to one symbol, and each symbol is 12 subcarriers. First, a ZC sequence with a length of 11 is generated based on a sequence number u, and then is supplemented to 12 REs. After FFT, subcarrier matching, and IFFT are performed on the generated sequence, a cyclic prefix is added, and short sequences used by the PSS are output, where each short sequence corresponds to one symbol, where $$c_u(n) = e^{-\frac{j\pi u n(n+1)}{11}}, n = \{0, 1, 2, \ldots, 10\}, \text{ and}$$

$$d_u(n+1) = d_u(n)c_u(n), n = \{0, 1, 2, \ldots, 10\}, d_u(0) = 1.$$

Figure 11:
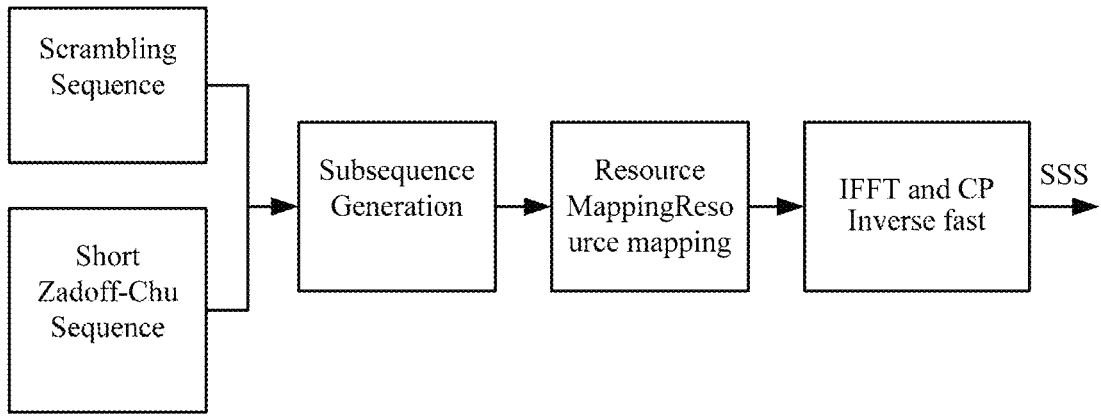
FIG. 11 is a schematic diagram of a process of generating a short sequence of an SSS according to an embodiment of the present invention.

Referring to FIG. 11, FIG. 11 is a schematic diagram of a process of generating a short sequence used by an SSS. As described above, each short sequence corresponds to one symbol, and each symbol is 12 subcarriers. First, a ZC sequence with a length of 11 is generated based on a sequence number p, a scrambling code sequence with a length of 11 is generated based on a sequence number q, and array elements in the generated ZC sequence are multiplied by those in the scrambling code sequence sequentially. After subsequence generation, subcarrier matching, IFFT, and a CP are respectively added, and short sequences are output, where each short sequence corresponds to one symbol, where $$a_p(n) = e^{-\frac{j\pi m_p n(n+1)}{11}} c_{k_p}(n), n = \{0, 1, 2, \ldots, 10\}.$$

In the foregoing formula, p=0, 1, 2, 3, ..., 503, $m_p$=1+mod(p,11), and $$k_p = \left\lfloor \frac{p}{11} \right\rfloor.$$

$c_{k_p}(n)$ is an M sequence, and different $k_p$ values correspond to different sequences.

$$b_q = b(\text{mod}(n-l_q)), n=\{0,1,2,\ldots,10\}, q=\{0,1,2,\ldots,5\}.$$

In the foregoing formula, b(n+6)=mod(b(n)+b(n+1),2), n={0, 1, ..., 5}, b(0)=1, b(m)=0, m={1, 2, 3, 4, 5}, and $l_0$=0; $l_1$=17; $l_2$=3; $l_3$=23; $l_4$=7; $l_5$=29.

When the base station generates multiple groups of synchronization signals, the PSS and the SSS in each group of synchronization signals may be mapped to different time domain resources or frequency domain resources, or may use a long sequence or a short sequence. Referring to FIG. 10 to FIG. 17, to describe a resource mapping method provided by this embodiment of the present invention, the following uses an example in which the base station generates six groups of synchronization signals. Different groups of synchronization signals correspond to different spatial resources, and are transmitted by using different beams. B1 to B6 shown in FIG. 10 to FIG. 17 correspond to beams B1 to B6 respectively (referring to FIG. 3). "PSS-Long" indicates that the PSS uses a long sequence, "PSS-Short" indicates that the PSS uses a short sequence, "SSS-Long" indicates that the SSS uses a long sequence, and "SSS-Short" indicates that the SSS uses a short sequence. This is not described again hereinafter.

Referring to FIG. 12, each group of synchronization signals occupies one of six PRBs, and each group of synchronization signals spans multiple symbols in time domain. For example, each group of synchronization signals occupies six OFDM symbols. Each group of synchronization signals occupies a same physical resource on different symbols. Different groups of synchronization signals occupy different frequency domain resources on a same symbol.

The PSS uses a long sequence, and the long sequence is split into several parts, where each part is mapped to one symbol. The SSS uses a long sequence, and the long sequence is split into several parts, where each part is mapped to one symbol.

Different groups of synchronization signals correspond to different spatial resources, and are transmitted by using different beams.

Referring to FIG. 13, each group of synchronization signals occupies one of six PRBs, and each group of synchronization signals spans multiple symbols in time domain. For example, each group of synchronization signals occupies six OFDM symbols. Each group of synchronization signals occupies a same physical resource on different symbols. Different groups of synchronization signals occupy different frequency domain resources on a same symbol.

The PSS uses a short sequence, and each short sequence is mapped to one symbol and repeated in time domain. The SSS uses a long sequence, and the long sequence is split into several parts, where each part is mapped to one symbol.

Different groups of synchronization signals correspond to different spatial resources, and are transmitted by using different beams.

Referring to FIG. 14, each group of synchronization signals occupies one of six PRBs, and each group of synchronization signals spans multiple symbols in time domain. For example, each group of synchronization signals occupies six OFDM symbols. Each group of synchronization signals occupies a same frequency domain resource on different symbols. Different groups of synchronization signals occupy different frequency domain resources on a same symbol.

The PSS uses a long sequence, and the long sequence is split into several parts, where each part is mapped to one symbol. The SSS uses a short sequence, and each short sequence is mapped to one symbol and repeated in time domain.

Different groups of synchronization signals correspond to different spatial resources, and are transmitted by using different beams.

Referring to FIG. 15, each group of synchronization signals occupies one of six PRBs, and each group of synchronization signals spans multiple symbols in time domain. For example, each group of synchronization signals occupies six OFDM symbols. Each group of synchronization signals occupies a same physical resource on different symbols. Different groups of synchronization signals occupy different frequency domain resources on a same symbol.

The PSS uses a short sequence, and each short sequence is mapped to one symbol and repeated in time domain. The SSS uses a short sequence, and each short sequence is mapped to one symbol and repeated in time domain.

Different groups of synchronization signals correspond to different spatial resources, and are transmitted by using different beams.

Referring to FIG. 16, each group of synchronization signals occupies one of six PRBs, and each group of synchronization signals spans multiple symbols in time domain. For example, each group of synchronization signals occupies six OFDM symbols. Each group of synchronization signals occupies different frequency domain resources on different symbols. In this way, a frequency diversity gain can be obtained. Different groups of synchronization signals occupy different frequency domain resources on a same symbol.

The PSS uses a long sequence, and the long sequence is split into several parts, where each part is mapped to one symbol. The SSS uses a long sequence, and the long sequence is split into several parts, where each part is mapped to one symbol.

Different groups of synchronization signals correspond to different spatial resources, and are transmitted by using different beams.

Referring to FIG. 17, each group of synchronization signals occupies one of six PRBs, and each group of synchronization signals spans multiple symbols in time domain. For example, each group of synchronization signals occupies six OFDM symbols. Each group of synchronization signals occupies different frequency domain resources on different symbols. In this way, a frequency diversity gain can be obtained. Different groups of synchronization signals occupy different frequency domain resources on a same symbol.

The PSS uses a short sequence, and each short sequence is mapped to one symbol and repeated in time domain. The SSS uses a long sequence, and the long sequence is split into several parts, where each part is mapped to one symbol.

Different groups of synchronization signals correspond to different spatial resources, and are transmitted by using different beams.

Referring to FIG. 18, each group of synchronization signals occupies one of six PRBs, and each group of synchronization signals spans multiple symbols in time domain. For example, each group of synchronization signals occupies six OFDM symbols. Each group of synchronization signals occupies different frequency domain resources on different symbols. In this way, a frequency diversity gain can be obtained. Different groups of synchronization signals occupy different frequency domain resources on a same symbol.

The PSS uses a long sequence, and the long sequence is split into several parts, where each part is mapped to one symbol. The SSS uses a short sequence, and each short sequence is mapped to one symbol and repeated in time domain.

Different groups of synchronization signals correspond to different spatial resources, and are transmitted by using different beams.

Referring to FIG. 19, each group of synchronization signals occupies one of six PRBs, and each group of synchronization signals spans multiple symbols in time domain. For example, each group of synchronization signals occupies six OFDM symbols. Each group of synchronization signals occupies different frequency domain resources on different symbols. In this way, a frequency diversity gain can be obtained. Different groups of synchronization signals occupy different frequency domain resources on a same symbol.

The PSS uses a short sequence, and each short sequence is mapped to one symbol and repeated in time domain. The SSS uses a short sequence. Each short sequence is mapped to one symbol and repeated in time domain.

Different groups of synchronization signals correspond to different spatial resources, and are transmitted by using different beams.

Figure 20:
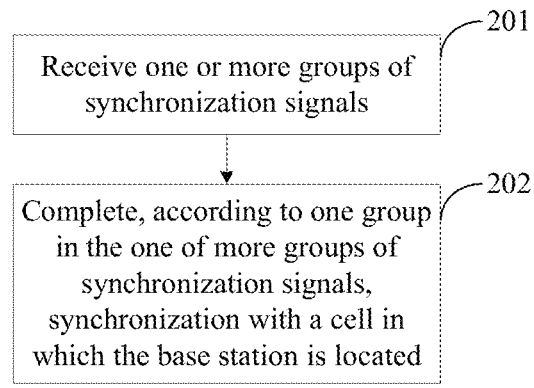
FIG. 20 is an illustrative schematic flowchart of a synchronization signal receiving method according to an embodiment of the present invention.

Referring to FIG. 20, FIG. 20 is a schematic flowchart of a synchronization signal receiving method according to an implementation of the present invention. The synchronization signal receiving method is performed by user equipment. The receiving method includes the following steps.

Step 201: User equipment receives one or more groups of synchronization signals from a base station, where each group of synchronization signals is mapped to N PRBs and occupies multiple symbols in time domain, and N is a positive integer greater than or equal to 1. Specifically, the synchronization signals include a PSS and an SSS. In frequency domain, the PSS and the SSS in each group of synchronization signals are mapped to the N PRBs. In different implementations, each group of synchronization signals occupies a same frequency domain resource on different symbols, or each group of synchronization signals occupies different frequency domain resources on different symbols. In time domain, the PSS occupies $P_1$ symbols, and the SSS occupies $P_2$ symbols. $P_1$ and $P_2$ are both positive integers. It should be noted that, for multiple optional synchronization signal resource mapping solutions, refer to detailed descriptions in the foregoing embodiment. Details are not further described herein.

Step 202: The user equipment completes, according to one group in the one of more groups of synchronization signals, synchronization with a cell in which the base station is located.

Figure 21:
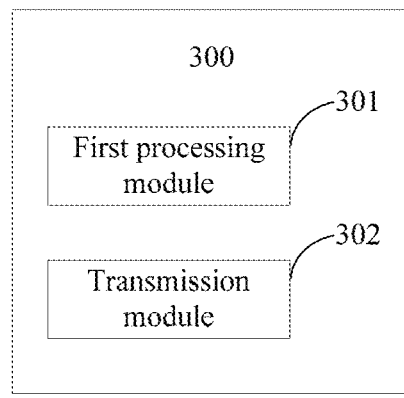
FIG. 21 is a schematic modular diagram of a base station according to an embodiment of the present invention.

Referring to FIG. 21, FIG. 21 is a schematic modular diagram of a base station 300 according to an implementation of the present invention. The base station 300 includes a first processing module 301 and a transmission module 302.

The first processing module 301 is configured to configure one or more groups of synchronization signals, where each group of synchronization signals is mapped to N PRBs and occupies multiple symbols in time domain, and N is a positive integer greater than or equal to 1. Specifically, a group of synchronization signals includes a PSS and an SSS. In frequency domain, the base station configures a PSS and an SSS in each group of synchronization signals to map to the N PRBs. In different implementations, each group of synchronization signals occupies a same frequency domain resource on different symbols, or each group of synchronization signals occupies different frequency domain resources on different symbols. In time domain, the first processing module 301 configures the PSS to occupy $P_1$ symbols, and the SSS to occupy $P_2$ symbols. $P_1$ and $P_2$ are both positive integers.

The transmission module 302 is configured to transmit the one or more groups of synchronization signals.

Specifically, when there is one group of synchronization signals, the base station transmits the synchronization signals by using one beam. When there are multiple groups of synchronization signals, the synchronization signals in different groups correspond to different spatial resources, and each group of synchronization signals is transmitted by using a different beam. Referring to FIG. 3, with respect to beams used to transmit synchronization signals, a wide beam is formed in a horizontal direction to ensure omnidirectional coverage, and a narrow beam is formed in a vertical direction, so that transmit power is concentrated in a limited spatial range to obtain a beamforming gain.

Figure 22:
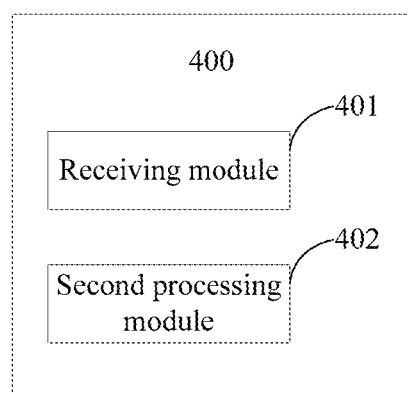
FIG. 22 is a schematic modular diagram of user equipment according to an embodiment of the present invention.

Referring to FIG. 22, FIG. 22 is a schematic modular diagram of user equipment 400 according to an implementation of the present invention. The user equipment 400 includes a receiving module 401 and a second processing module 402.

The receiving module 401 is configured to receive one or more groups of synchronization signals from a base station, where each group of synchronization signals is mapped to N PRBs and occupies multiple symbols in time domain, and N is a positive integer greater than or equal to 1. Specifically, a group of synchronization signals includes a PSS and an SSS. In frequency domain, the base station configures a PSS and an SSS in each group of synchronization signals to map to the N PRBs. In different implementations, each group of synchronization signals occupies a same frequency domain resource on different symbols, or each group of synchronization signals occupies different frequency domain resources on different symbols. In time domain, the base station configures the PSS to occupy $P_1$ symbols, and the SSS to occupy $P_2$ symbols. $P_1$ and $P_2$ are both positive integers.

The second processing module 402 is configured to complete, according to one group in the one of more groups of synchronization signals, synchronization with a cell in which the base station is located.

Figure 23:
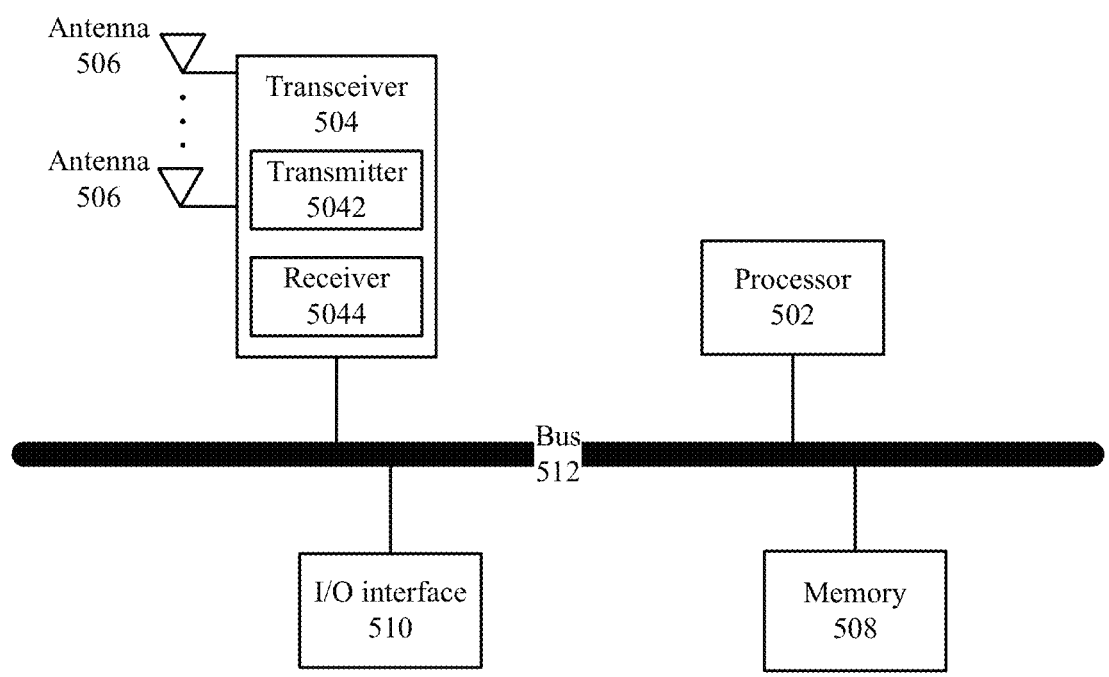
FIG. 23 is a schematic diagram of a hardware structure of a base station according to an embodiment of the present invention.

FIG. 23 is a schematic diagram of a hardware structure of a base station 500 according to an embodiment of the present invention. As shown in FIG. 23, the base station 500 includes a processor 502, a transceiver 504, multiple antennas 506, a memory 508, an I/O interface 510, and a bus 512. The transceiver 504 further includes a transmitter 5042 and a receiver 5044, and the memory 508 is further configured to store an instruction 5082 and data 5084. In addition, the processor 502, the transceiver 504, the memory 508, and the I/O interface 510 are communicatively connected to each other by the bus 512, and the multiple antennas 506 are connected to the transceiver 504.

The processor 502 may be a general purpose processor, for example, including but not limited to a CPU, or may be a dedicated processor, for example, including but not limited to a DSP, an ASIC, an FPGA, or the like. In addition, the processor 502 may be a combination of multiple processors. The processor 502 is configured to perform, for example, step 101 in the method shown in FIG. 2. The processor 502 may be a processor specially designed to perform the foregoing operation and/or step, or may perform the foregoing operation and/or step by reading and executing the instruction stored in the memory 508. The processor 502 may need to use data in a process of performing the foregoing operation and/or step.

The transceiver 504 includes the transmitter 5042 and the receiver 5044. The transmitter 5042 is configured to transmit a downlink signal to user equipment by using at least one of the multiple antennas 506. The receiver 5044 is configured to receive an uplink signal from the user equipment by using at least one of the multiple antennas 506. The transmitter 5042 is specifically configured to perform, by using at least one of the multiple antennas 506, for example, step 102 in the method shown in FIG. 2. The receiver 5044 is specifically configured to receive an uplink signal from the user equipment by using at least one of the multiple antennas 506.

The memory 508 may be any type of storage medium, for example, a RAM, a ROM, an NVRAM, a PROM, an EPROM, an EEPROM, a flash memory, an optical memory, or a register. The memory 508 is specifically configured to store the instruction and the data. The processor 502 may perform the foregoing operation and/or step by reading and executing the instruction stored in the memory 508, and may need to use the data in the process of performing the foregoing operation and/or step.

The I/O interface 510 is configured to receive an instruction and/or data from a peripheral, and output an instruction and/or data to the peripheral.

It should be noted that, in a specific implementation process, the base station 500 may further include other hardware components. The components are not listed one by one in the specification.

Figure 24:
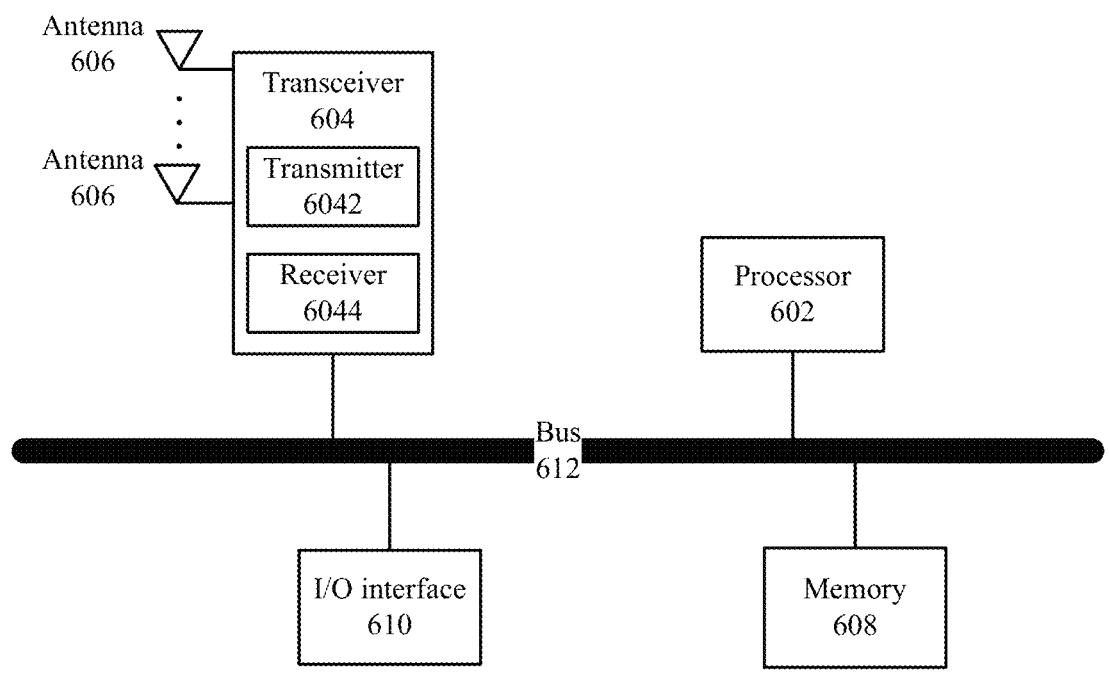
FIG. 24 is a schematic diagram of a hardware structure of user equipment according to an embodiment of the present invention.

FIG. 24 is a schematic diagram of a hardware structure of user equipment 600 according to an embodiment of the present invention. As shown in FIG. 24, the user equipment 600 includes a processor 602, a transceiver 604, multiple antennas 606, a memory 608, an input/output (I/O) interface 610, and a bus 612. The transceiver 604 further includes a transmitter 6042 and a receiver 6044, and the memory 608 is further configured to store an instruction 6082 and data 6084. In addition, the processor 602, the transceiver 604, the memory 608, and the I/O interface 610 are communicatively connected to each other by the bus 612, and the multiple antennas 606 are connected to the transceiver 604.

The processor 602 may be a general purpose processor, for example, including but not limited to a central processing unit (CPU), or may be a dedicated processor, for example, including but not limited to a digital signal processor (DSP), an application-specific integrated circuit (ASIC), a field programmable gate array (FPGA), or the like. In addition, the processor 602 may be a combination of multiple processors. The processor 602 is configured to perform, for example, step 202 in the method shown in FIG. 20. The processor 602 may be a processor specially designed to perform the foregoing operation and/or step, or may perform the foregoing operation and/or step by reading and executing the instruction stored in the memory 608. The processor 602 may need to use the data in a process of performing the foregoing operation and/or step.

The transceiver 604 includes the transmitter 6042 and the receiver 6044. The transmitter 6042 is configured to transmit an uplink signal to a base station by using at least one of the multiple antennas 606. The receiver 6044 is configured to receive a downlink signal from the base station by using at least one of the multiple antennas 606. The transmitter 6042 is specifically configured to transmit an uplink signal to the base station by using at least one of the multiple antennas 606. The receiver 6044 is specifically configured to perform, by using at least one of the multiple antennas 606, for example, step 201 in the method shown in FIG. 20.

The memory 608 may be any type of storage medium, for example, a random access memory (RAM), a read-only memory (ROM), a non-volatile random access memory (NVRAM), a programmable read-only memory (PROM), an erasable programmable read-only memory (EPROM), an electrically erasable PROM (EEPROM), a flash memory, an optical memory, or a register. The memory 608 is specifically configured to store the instruction 6082 and the data 6084. The processor 602 may perform the foregoing operation and/or step by reading and executing the instruction stored in the memory 608, and may need to use the data in the process of performing the foregoing operation and/or step.

The I/O interface 610 is configured to receive an instruction and/or data from a peripheral, and output an instruction and/or data to the peripheral.

It should be noted that, in a specific implementation process, the user equipment 600 may further include other hardware components. The components are not listed one by one in the specification.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, multiple units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

What is claimed is:
1. A synchronization signal transmitting method, wherein the method comprises:
configuring, by a base station, multiple groups of synchronization signals, wherein each group of synchronization signals comprises a primary synchronization signal (PSS) and a secondary synchronization signal

(SSS), wherein each group of synchronization signals is mapped to N physical resource blocks (PRBs), wherein N is a positive integer greater than or equal to 1, wherein each of the PSS and the SSS in a first group of synchronization signals of the multiple groups of synchronization signals occupies at least one symbol in time domain, wherein one of the PSS or the SSS in the first group of synchronization signals occupies multiple symbols in the time domain, and wherein:
- the PSS or the SSS in the first group of synchronization signals occupying the multiple symbols in the time domain is split into multiple parts that are mapped to the multiple symbols in the time domain; and
- each part of the PSS or the SSS in the first group of synchronization signals that is split into the multiple parts is mapped to a single symbol of the multiple symbols; and transmitting, by the base station, the multiple groups of synchronization signals including the first group of synchronization signals, wherein each group of synchronization signals is transmitted by using a different beam.

2. The method according to claim 1, wherein the PSS and the SSS in each group of synchronization signals are mapped to the N PRBs, wherein in the time domain, the PSS in each group occupies $P_1$ symbols, the SSS in each group occupies $P_2$ symbols, and $P_1$ and $P_2$ are both positive integers.

3. The method according to claim 2, wherein each group of synchronization signals occupies a same frequency domain resource on different symbols.

4. The method according to claim 2, wherein each group of synchronization signals occupies different frequency domain resources on different symbols.

5. The method according to claim 1, wherein synchronization signals in different groups correspond to different spatial resources.

6. The method according to claim 5, wherein a second group of synchronization signals is transmitted in a horizontal direction by using a wide beam, and wherein a third group of synchronization signals is transmitted in a vertical direction by using a narrow beam.

7. A base station, comprising:
- at least one processor, the at least one processor configured to configure multiple groups of synchronization signals, wherein each group of synchronization signals comprises a primary synchronization signal (PSS) and a secondary synchronization signal (SSS), wherein each group of synchronization signals is mapped to N physical resource blocks (PRBs), wherein N is a positive integer greater than or equal to 1, wherein each of the PSS and the SSS in a first group of synchronization signals of the multiple groups of synchronization signals occupies at least one symbol in time domain, wherein one of the PSS or the SSS in the first group of synchronization signals occupies multiple symbols in the time domain, and wherein:
  - the PSS or the SSS in the first group of synchronization signals occupying the multiple symbols in the time domain is split into multiple parts that are mapped to the multiple symbols in the time domain; and
  - each part of the PSS or the SSS in the first group of synchronization signals that is split into the multiple parts is mapped to a single symbol of the multiple symbols; and
- a transmitter, the transmitter configured to transmit the multiple groups of synchronization signals including the first group of synchronization signals, wherein each group of synchronization signals is transmitted by using a different beam.

8. The base station according to claim 7, wherein the PSS and the SSS in each group of synchronization signals are mapped to the N PRBs, wherein in the time domain, the PSS in each group occupies $P_1$ symbols, the SSS in each group occupies $P_2$ symbols, and $P_1$ and $P_2$ are both positive integers.

9. The base station according to claim 8, wherein each group of synchronization signals occupies a same frequency domain resource on different symbols.

10. The base station according to claim 8, wherein each group of synchronization signals occupies different frequency domain resources on different symbols.

11. The base station according to claim 7, wherein synchronization signals in different groups correspond to different spatial resources.

12. The base station according to claim 11, wherein a second group of synchronization signals is transmitted in a horizontal direction by using a wide beam, and wherein a third group of synchronization signals is transmitted in a vertical direction by using a narrow beam.

13. A synchronization signal receiving method, wherein the method comprises:
- receiving, by a user equipment, multiple groups of synchronization signals from a base station, wherein each group of synchronization signals comprises a primary synchronization signal (PSS) and a secondary synchronization signal (SSS), wherein each group of synchronization signals is mapped to N physical resource blocks (PRBs), wherein N is a positive integer greater than or equal to 1, wherein each of the PSS and the SSS in a first group of synchronization signals of the multiple groups of synchronization signals occupies at least one symbol in time domain, wherein one of the PSS or the SSS in the first group of synchronization signals occupies multiple symbols in the time domain, and wherein:
  - the PSS or the SSS in the first group of synchronization signals occupying the multiple symbols in the time domain is split into multiple parts that are mapped to the multiple symbols in the time domain; and
  - each part of the PSS or the SSS in the first group of synchronization signals that is split into the multiple parts is mapped to a single symbol of the multiple symbols; and
- completing, by the user equipment according to one group in the multiple groups of synchronization signals including the first group of synchronization signals, synchronization with a cell in which the base station is located.

14. The method according to claim 13, wherein the PSS and the SSS in each group of synchronization signals are mapped to the N PRBs, wherein in the time domain, the PSS in each group occupies $P_1$ symbols, the SSS in each group occupies $P_2$ symbols, and $P_1$ and $P_2$ are both positive integers.

15. The method according to claim 14, wherein each group of synchronization signals occupies a same frequency domain resource on different symbols.

16. The method according to claim 14, wherein each group of synchronization signals occupies different frequency domain resources on different symbols.

17. A user equipment, comprising:
- a receiver, the receiver configured to receive multiple groups of synchronization signals from a base station, wherein each group of synchronization signals comprises a primary synchronization signal (PSS) and a secondary synchronization signal (SSS), wherein each group of synchronization signals is mapped to N physical resource blocks (PRBs), wherein N is a positive integer greater than or equal to 1, wherein each of the PSS and the SSS in a first group of synchronization signals of the multiple groups of synchronization signals occupies at least one symbol in time domain, wherein one of the PSS or the SSS in the first group of synchronization signals occupies multiple symbols in the time domain, and wherein:

the PSS or the SSS in the first group of synchronization signals occupying the multiple symbols in the time domain is split into multiple parts that are mapped to the multiple symbols in the time domain; and each part of the PSS or the SSS in the first group of synchronization signals that is split into the multiple parts is mapped to a single symbol of the multiple symbols; and at least one processor, the at least one processor configured to complete, according to one group in the multiple groups of synchronization signals including the first group of synchronization signals, synchronization with a cell in which the base station is located.

18. The user equipment according to claim 17, wherein each group of synchronization signals occupies a same frequency domain resource on different symbols.

19. The user equipment according to claim 17, wherein each group of synchronization signals occupies different frequency domain resources on different symbols.

* * * * *